US008111675B2

(12) United States Patent
Kim et al.

(10) Patent No.: US 8,111,675 B2
(45) Date of Patent: Feb. 7, 2012

(54) CHANNEL SEARCH METHOD AND SYSTEM FOR VERTICAL HANDOFF IN WIRELESS NETWORK ENVIRONMENT

(75) Inventors: Jae Hoon Kim, Seoul (KR); Ji Hoon Lee, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 745 days.

(21) Appl. No.: 11/790,781

(22) Filed: Apr. 27, 2007

(65) Prior Publication Data

US 2008/0159225 A1    Jul. 3, 2008

(30) Foreign Application Priority Data

Jan. 2, 2007 (KR) ........................ 10-2007-0000316

(51) Int. Cl.
*H04W 4/00* (2009.01)

(52) U.S. Cl. .................... 370/338; 455/41.2; 455/432.1; 455/436; 455/161; 455/166.1; 455/166.2; 455/434; 455/435.1; 455/435.2; 455/435.4; 455/443; 455/450; 455/452.1; 455/452.2; 455/464; 455/502; 455/509; 455/512; 455/525; 455/62; 370/331; 370/465; 370/492; 370/328; 370/437; 370/432; 370/329; 370/407; 370/406; 370/395.31; 370/408; 370/395.42; 370/341; 370/332; 370/324

(58) Field of Classification Search ................ 455/41.2, 455/432.1, 436, 161, 166.1, 166.2, 434, 435.1, 455/435.2, 435.3, 443, 452.1, 452.2, 450, 455/464, 502, 509, 512, 525, 62, 67.11; 370/331, 370/492, 465, 338, 328, 437, 432, 329, 407, 370/406, 395.31, 408, 395.42, 341, 332, 370/324

See application file for complete search history.

(56) References Cited

U.S. PATENT DOCUMENTS

| 7,107,498 | B1 | 9/2006 | Schmidt |
| 7,260,393 | B2* | 8/2007 | Fnu et al. .................... 455/432.1 |
| 2003/0036350 | A1* | 2/2003 | Jonsson et al. ................... 455/41 |
| 2004/0146035 | A1* | 7/2004 | Lee et al. ....................... 370/338 |
| 2004/0157613 | A1* | 8/2004 | Steer et al. ..................... 455/446 |
| 2004/0203787 | A1 | 10/2004 | Naghian |
| 2004/0266351 | A1* | 12/2004 | Chuah et al. ..................... 455/62 |
| 2005/0063334 | A1* | 3/2005 | Fnu et al. ....................... 370/329 |
| 2006/0014536 | A1* | 1/2006 | Demirhan et al. ............ 455/434 |
| 2006/0089138 | A1* | 4/2006 | Smith et al. ................ 455/426.1 |

(Continued)

FOREIGN PATENT DOCUMENTS

JP    2004/166277    6/2004

(Continued)

*Primary Examiner* — Kwasi Karikari
(74) *Attorney, Agent, or Firm* — NSIP Law

(57) ABSTRACT

A channel search method for a vertical handoff in a wireless network environment is provided, the channel search method including: collecting channel information from a first terminal which is provided with a wireless local area network (WLAN) service via a channel connection with a WLAN node; and determining a channel search order for a channel connection between a second terminal and the WLAN node by using the collected channel information. A channel search system for a vertical handoff in a wireless network environment is also provided, the channel search system including: a channel information collection unit for collecting channel information from a first terminal which is provided with a WLAN service via a channel connection with a WLAN node and a search order determination unit for determining a channel search order for a channel connection between a second terminal and the WLAN node by using the collected channel information.

13 Claims, 4 Drawing Sheets

U.S. PATENT DOCUMENTS

| | | | |
|---|---|---|---|
| 2006/0209882 A1* | 9/2006 | Han et al. | 370/465 |
| 2006/0230150 A1* | 10/2006 | Roy | 709/226 |
| 2006/0271703 A1* | 11/2006 | Kim et al. | 709/239 |
| 2007/0014269 A1* | 1/2007 | Sherman et al. | 370/338 |
| 2007/0030826 A1* | 2/2007 | Zhang et al. | 370/331 |
| 2007/0183374 A1* | 8/2007 | Classon et al. | 370/338 |
| 2008/0002616 A1* | 1/2008 | Stahl et al. | 370/329 |
| 2008/0008140 A1* | 1/2008 | Forssell | 370/338 |
| 2008/0049702 A1* | 2/2008 | Meylan et al. | 370/342 |
| 2008/0102845 A1* | 5/2008 | Zhao | 455/450 |

FOREIGN PATENT DOCUMENTS

| | | |
|---|---|---|
| KR | 1020040040224 | 5/2004 |
| KR | 1020040085719 | 10/2004 |
| KR | 1020050066286 | 6/2005 |
| KR | 1020050081510 | 8/2005 |
| KR | 1020060040237 | 5/2006 |
| WO | 2004/109473 | 12/2004 |

* cited by examiner

CHANNEL SEARCH METHOD AND SYSTEM FOR VERTICAL HANDOFF IN WIRELESS NETWORK ENVIRONMENT

CROSS-REFERENCE TO RELATED APPLICATION

This application claims the benefit under 35 U.S.C. § 119(a) of Korean Patent Application No. 10-2007-0000316, filed on Jan. 2, 2007, in the Korean Intellectual Property Office, the entire disclosure of which is hereby incorporated by reference.

BACKGROUND OF THE INVENTION

1. Field of the Invention

The present invention relates to a channel search method and system for a vertical handoff in a wireless network environment. More particularly, the present invention relates to a channel search method and system for a vertical handoff and a wireless local area network (WLAN) service subscription in a wireless network environment.

2. Description of Related Art

Recently, there has been dramatic development in wireless communication networks. Various communication networks such as cellular-based mobile communication networks, wireless broadband Internet (WiBro) networks, wireless local area networks (WLANs), and wireless personal area networks (WPANs) provide users with a variety of communication services.

Along with advancements in communication networks, there have been developments in mobile communication terminals. Terminals such as multi-mode mobile communication terminals are now being introduced that can receive services from various heterogeneous communication networks. Multi-mode mobile communication terminals include a plurality of wireless interfaces, and may connect to various wireless communication networks.

A vertical handoff operation from a single communication network to another communication network is required so that multi-mode mobile communication terminals provide reliable service among scattered heterogeneous communication networks. For such vertical handoff, mobile communication terminals search for a communicable channel with WLAN nodes when the mobile communication terminals enter coverage areas of the WLAN nodes, and select the communicable channel, and thereby may set an association and authorization with the WLAN nodes. To locate the communicable channel, the mobile communication terminals perform a successive channel search from a first channel to an eleventh channel. Also, the mobile communication terminals locate the communicable channel and use the communicable channel for setting the association.

However, a time delay in the vertical handoff may be caused in heterogeneous wireless environments due to the successive channel search.

For example, when the communicable channel is the eleventh channel, a great amount of time may be spent in locating the channel, and the mobile communication terminals may unnecessarily waste energy.

Accordingly, there is a need for a channel search method and system for a vertical handoff in a wireless network environment to overcome such disadvantages of the conventional art, and provide more efficient vertical handoff.

SUMMARY OF THE INVENTION

Exemplary embodiments of the present invention address at least the above problems and/or disadvantages and provide at least the advantages described below. Accordingly, an aspect of exemplary embodiments of the present invention is to provide a channel search method and system for a vertical handoff in a wireless network environment where a terminal, which is located in a coverage area of a WLAN node, gives priority to a channel, which is used when setting an association and communicating with the WLAN node, and thereby may determine a channel search order of the terminal which enters the coverage area of the WLAN node.

An aspect of an exemplary embodiment of the present invention also provides a channel search method and system for a vertical handoff in a wireless network environment which varies a channel search order when entering a coverage area by referring to a terminal located in the coverage area, and thereby may quickly perform a vertical handoff.

An aspect of an exemplary embodiment of the present invention also provides a channel search method and system for a vertical handoff in a wireless network environment which quickly performs a vertical handoff when entering a coverage area by referring to a terminal located in the coverage area, and thereby may reduce power consumption for the vertical handoff.

According to an aspect of exemplary embodiments of the present invention, there is provided a channel search method for a vertical handoff in a wireless network environment, the channel search method including: collecting channel information from a first terminal which is provided with a wireless local area network (WLAN) service via a channel connection with a WLAN node, and determining a channel search order for a channel connection between a second terminal and the WLAN node by using the collected channel information.

According to an aspect of exemplary embodiments of the present invention, there is provided a channel search system for a vertical handoff in a wireless network environment, the channel search system including: a channel information collection unit for collecting channel information from a first terminal which is provided with a WLAN service via a channel connection with a WLAN node, and a search order determination unit for determining a channel search order for a channel connection between a second terminal and the WLAN node by using the collected channel information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following detailed description, taken in conjunction with the accompanying drawings in which.

DETAILED DESCRIPTION OF THE EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In the exemplary embodiment of the present invention, a first terminal is located in a coverage area of a wireless local area network (WLAN) node. The first terminal is a multi-mode mobile communication terminal which is provided with a WLAN service from the WLAN node. A second terminal is a multi-mode mobile communication terminal which is approaching the coverage area of the WLAN node from outside the coverage area of the WLAN node in order to be provided with the WLAN service.

The WLAN node may be a node in a wireless Internet network providing the WLAN service to the first terminal or the second terminal in the coverage area. Also, the WLAN node may be a node for providing various communication services such as a wireless broadband Internet (WiBro) network, a wireless personal area network (WPAN), and the like.

Figure 1:
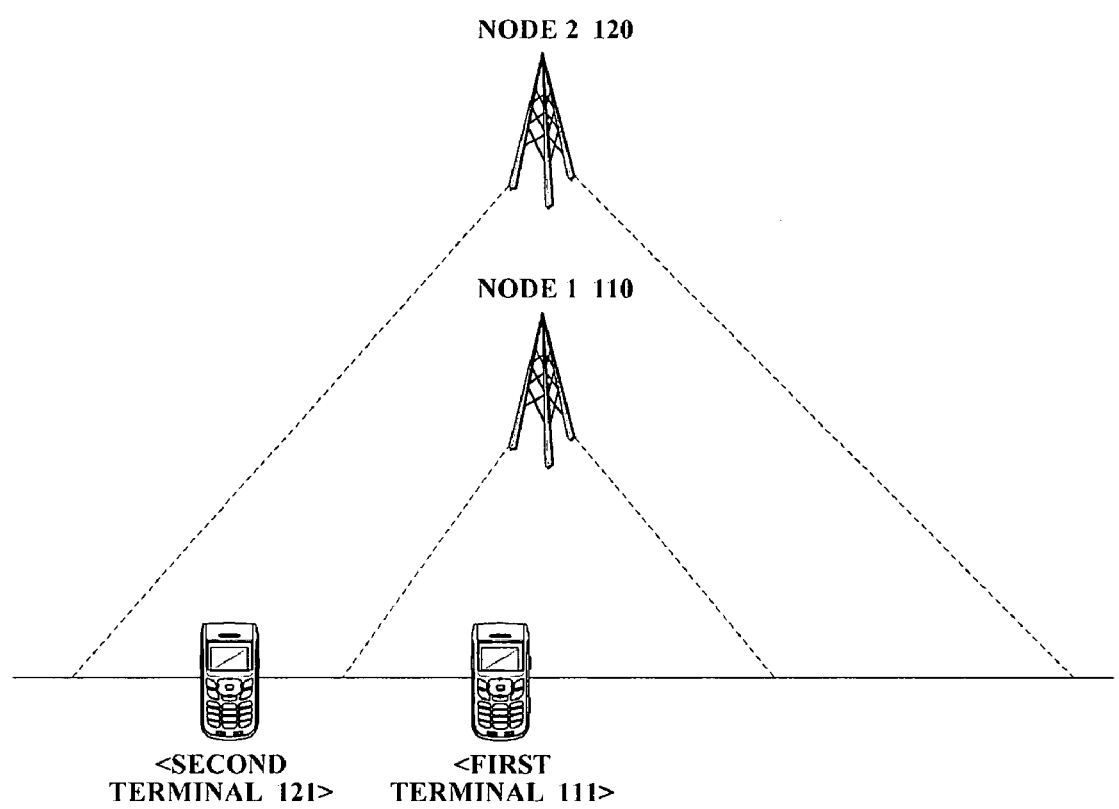
FIG. 1 is a diagram illustrating a channel search according to an exemplary embodiment of the present invention.

FIG. 1 is a diagram illustrating a channel search according to an exemplary embodiment of the present invention.

In FIG. 1, a channel search system according to an exemplary embodiment of the present invention is operated and included in a second terminal. In this embodiment, the second terminal is approaching a coverage area of a WLAN node to be provided with a WLAN service. However, the present invention is not limited to the described exemplary embodiment. Specifically, the channel search system may be located outside of the second terminal and operated independently.

Referring to FIG. 1, a node (1) 110 provides a coverage area, for example, a wireless Internet support area, which is represented by a dotted line. A first terminal 111 is located in the coverage area of the node (1) 110, and provided with a predetermined communication service, for example, WLAN service, from the node (1) 110.

A node (2) 120 provides a coverage area, for example, a call support area, which is represented by the dotted line. A second terminal 121 is located in the coverage area of the node (2) 120 on a path which is moving to the coverage area of the node (1) 110.

Hereinafter, as an example for convenience of description, the node (1) 110 is referred to as the WLAN node, and the node (2) 120 is described as a heterogeneous node excluding the WLAN node, such as a base station or a repeater for a wireless call service support.

The first terminal 111 sets a channel with the node (1) 110, and uses a communication service provided by the node (1) 110 via the set channel. As an example, when the node (1) 110 is the WLAN node, the communication service may be a wireless Internet service.

The second terminal 121 provided with the channel search system moves into the coverage area of the node (1) 110 from the coverage area of the node (2) 120, and may be provided with the WLAN service.

In this exemplary embodiment of the present invention, when the moving second terminal 121 enters a communication interfacing area of the first terminal 111 before entering the coverage area of the node (1) 110, the channel search system performs an overhearing operation with respect to the communication interfacing area, and receives channel information about a channel connection between the first terminal 111 and the node (1) 110. Specifically, the channel search system acquires information about the channel which is set by the first terminal 111 provided with the WLAN service.

The communication interfacing area is generated around the first terminal 111 according to a communication with the node (1) 110. The communication interfacing area may generally function as a noisy area to the second terminal 121. However, the channel search system may acquire the channel information about the first terminal 111, which is already provided with the WLAN service, through the overhearing operation with respect to the communication interfacing area. Also, the channel search system uses the acquired channel information for a channel search operation with respect to the second terminal 121 where the channel search operation will be performed.

A starting point in time of the overhearing operation may be a point in time when the second terminal 121 enters the communication interfacing area of the first terminal 111. As another example, the channel search system may start the overhearing operation when the communication interfacing area of the second terminal and the communication interfacing area of the first terminal overlap.

Specifically, depending on an exemplary embodiment of the present invention, although the second terminal 121 does not enter the coverage area of the node (1) 110, the channel search system may acquire the information about the channel which is set by the first terminal 111 through the overhearing operation with respect to the communication interfacing area of the first terminal 111.

In FIG. 1, the second terminal 121 is moving to be within the coverage area of the first terminal 111 from the outside of the coverage area of the node (1) 110. The channel search system, included in the second terminal 121, checks a communication signal between the node (1) 110 and the first terminal 111 through the overhearing operation with respect to the communication interfacing area of the first terminal 111. Also, the channel search system identifies the channel connected between the first terminal 111 and the node (1) 110 by the checked communication signal.

Also, when the second terminal 121 enters the coverage area of the node (1) 110, the channel search system gives priority to the identified channel and may perform a channel search for setting a channel between the second terminal 121 and the node (1) 110.

Generally, in related art, a terminal successively locates a communicable channel between the terminal and a node according to a predetermined standard, when the terminal enters a coverage area of the node, to set a channel with the node in a heterogeneous communication network according to a vertical handoff. As an example, in the related art, the communicable channel is selected as a channel having a signal strength greater than a threshold value by successively searching from a first channel with a relatively low frequency band to an eleventh channel with a relatively high frequency band.

As described above, the channel search system previously identifies the channel which is set by the terminal located in the coverage area of a corresponding node. Also, when determining a channel of a terminal which is entering the coverage area, the identified channel is primarily searched.

As an example, while determining the channel with respect to the second terminal 121, the channel search system first searches the channel set by the first terminal 111, or a channel located adjacent to the set channel, and successively performs the channel search with respect to other remaining channels. As an example, when the first terminal 111 is provided with the WLAN service from the WLAN node via a third channel, and the second terminal 121 enters a coverage area of the WLAN node, the channel search system may first search for the third channel or second/fourth channels, as a channel search order for the second terminal 121. The second/fourth channels are located adjacent to the third channel. When it is determined that a channel connection between the second communication terminal and the WLAN node is not available as a result of the channel search for the third channel, the channel search system may perform a successive channel search with respect to the other channels.

According to an exemplary embodiment of the present invention, the channel search system checks a current traffic amount for each channel from the identified channel, and may determine the channel connected between the second terminal 121 and the WLAN node by considering the traffic amount.

Figure 2:
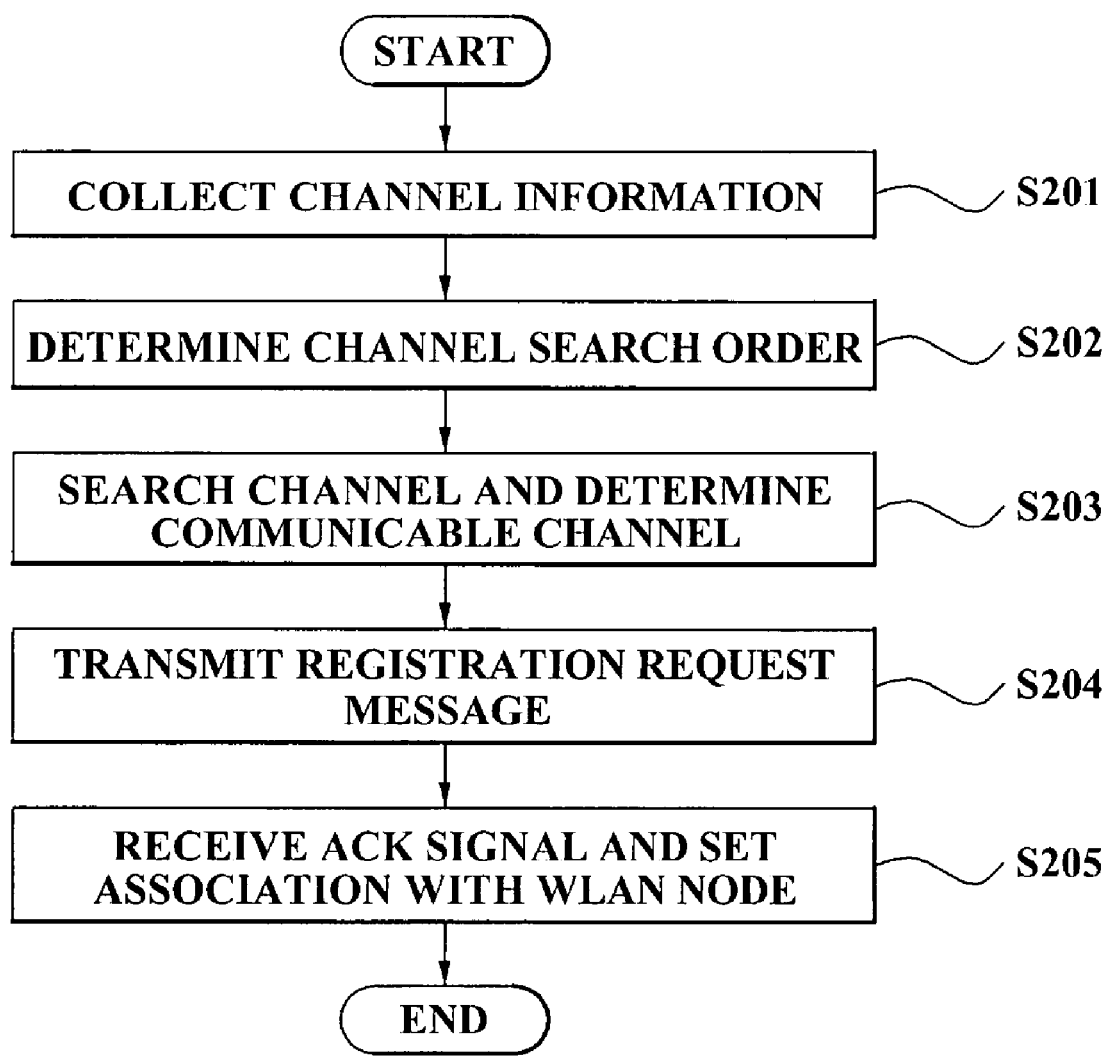
FIG. 2 is a flowchart illustrating a channel search method according to an exemplary embodiment of the present invention.

FIG. 2 is a flowchart illustrating a channel search method according to an exemplary embodiment of the present invention.

In operation S201, a channel search system collects channel information from a first terminal which is provided with a WLAN service via a channel connection with a WLAN node. In this embodiment, the channel search system may collect the channel information by performing an overhearing operation with respect to a communication interfacing area of the first terminal.

As described above, the communication interfacing area is generated around the first terminal according to a communication with the WLAN node. The communication interfacing area may include information about data which is exchanged between the WLAN node and the first terminal. Specifically, the channel search system may acquire the channel information about the first terminal, which is already provided with the WLAN service, through the overhearing operation with respect to the communication interfacing area.

In operation S202, the channel search system determines a channel search order for a channel connection between a second terminal and the WLAN node by using the collected channel information, when the second terminal enters a coverage area of the WLAN node. Specifically, the channel search system identifies a channel communicating between the first terminal and the WLAN node by the collected channel information.

Also, the channel search system may determine the channel search order where the identified channel is provided with a priority. As an example, when the identified channel between the first terminal and the WLAN node is a third channel, the channel search system sets a primary channel to connect the second terminal and the WLAN node as the third channel, and may control the channel search system to primarily search the third channel when the second terminal enters the coverage area.

In operation S203, when the second terminal enters the coverage area of the WLAN node, the channel search system searches a channel for an association. In this exemplary embodiment of the present invention, the channel search system determines a communicable channel via the channel search.

According to an exemplary embodiment of the present invention, the channel search system checks a current traffic amount for each channel from the identified channel, and may determine the identified channel for the association by considering the traffic amount.

In operation S204, when the communicable channel is determined, the channel search system generates and transmits a registration request message for setting the association to the WLAN node. In operation S205, the channel search system receives an acknowledge (ACK) signal corresponding to the registration request message from the WLAN node, and sets the association between the WLAN node and the second terminal. Also, when the association is set, the second terminal entering the coverage area of the WLAN node may use various wireless Internet services using the WLAN node.

When a communication terminal enters a coverage area of a corresponding node, the channel search system may perform a vertical handoff more rapidly by varying the channel search order. Also, the channel search system quickly performs the vertical handoff with respect to the communication terminal, by referring to a terminal located in the coverage area, and thereby may reduce power consumption for the vertical handoff.

Figure 3:
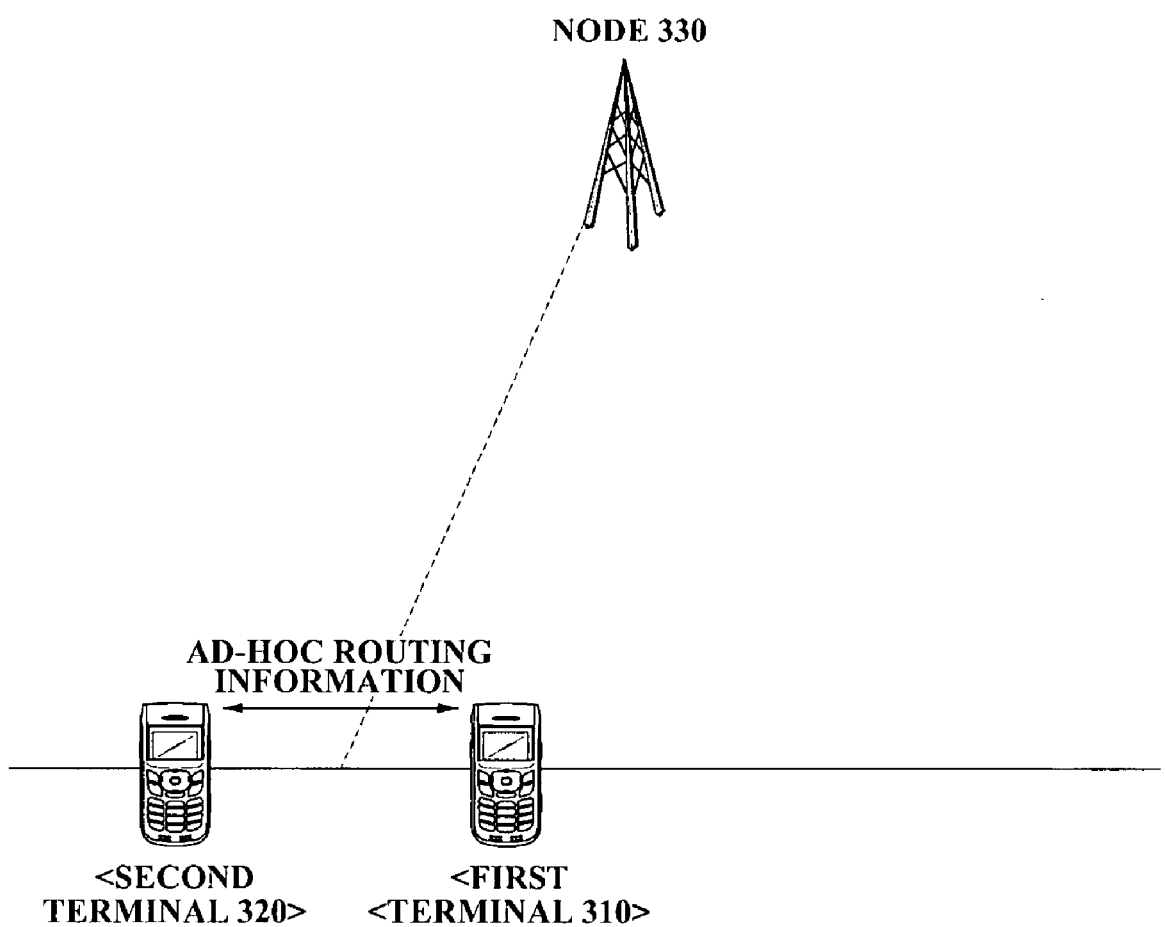
FIG. 3 is a diagram illustrating a channel search according to another exemplary embodiment of the present invention.

FIG. 3 is a diagram illustrating a channel search according to another exemplary embodiment of the present invention.

In FIG. 3, described is a second terminal 320 including a channel search system, which enters a coverage area of a node 330 and identifies a channel between a first terminal 310 and the node 330 through an overhearing operation. In FIG. 3, the channel is identified by collecting ad hoc routing information and a neighbor node list maintained by the first terminal 310.

For this, the first terminal 310 and the second terminal 320 are required to maintain a connection status. Also, the channel search system acquires the ad hoc routing information and the neighbor node list while exchanging a signal between the first terminal 310 and the second terminal 320.

Specifically, the first terminal 310 is operated as a host and a router at the same time, and embodies an ad hoc network. In this embodiment, the first terminal 310 maintains the ad hoc routing information to be operated as the router, and may provide the ad hoc routing information according to a request of the second terminal 320.

The ad hoc routing information is updated according to a routing protocol of an ad hoc on-demand distance vector (AODV) routing, a destination sequenced distance vector (DSDV) routing, a wireless routing protocol (WRP) routing, or a clusterhead gateway switch routing (CGSR). Accordingly, the channel search system included in the second terminal 320 may collect current channel information which is set between the first terminal 310 and the node 330.

Specifically, the channel search system may identify the channel set between the first terminal 310 and the node 330 by referring to the ad hoc routing information and the neighbor node list. Accordingly, the channel search system determines a channel search order by giving priority to the identified channel. Also, the channel search system performs a channel search operation with respect to a channel set in the second terminal 320 by using the determined channel search order when entering the coverage area of the node 330.

Also, when a communicable channel is selected, the channel search system transmits a registration request message for a vertical handoff to the node 330 by using a corresponding channel. The node 330 sets a channel between the second terminal 320 and the node 330 in response to the transmitted registration request message, by transmitting the ACK signal to the second terminal 320.

Figure 4:
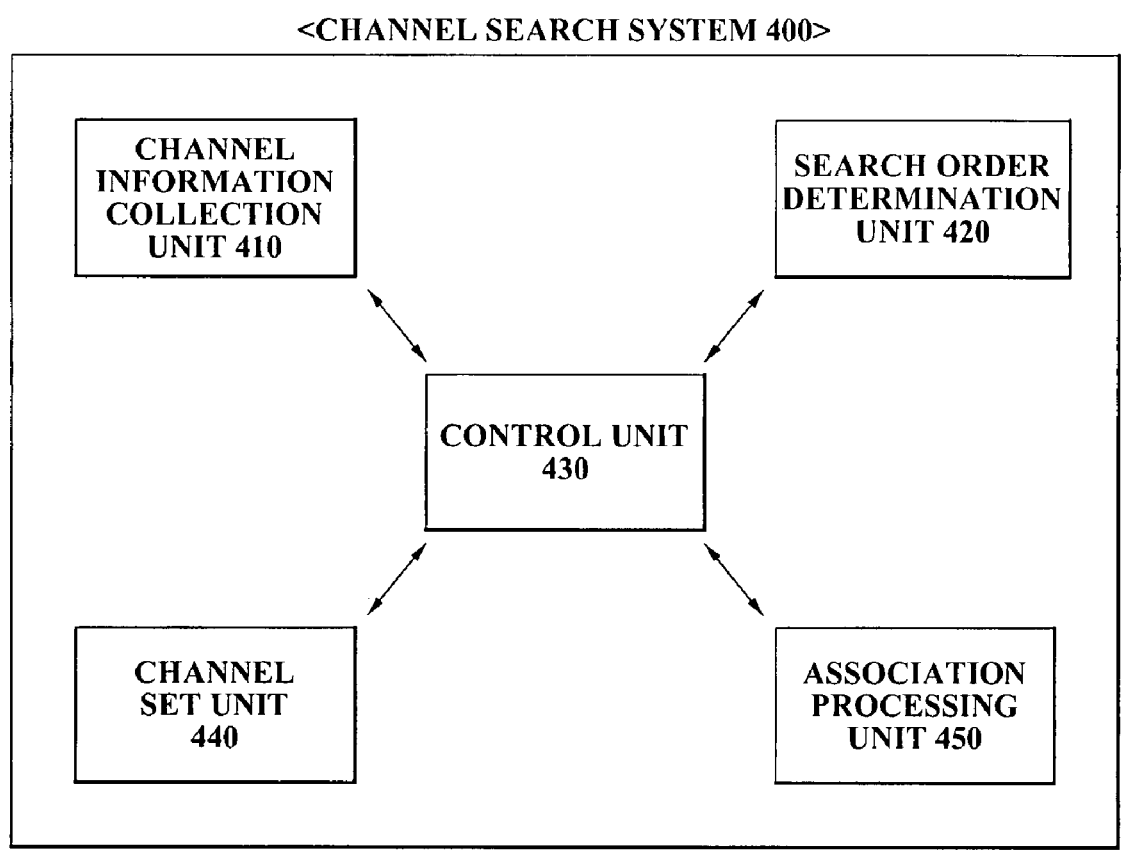
FIG. 4 is a block diagram illustrating a configuration of a channel search system according to an exemplary embodiment of the present invention.

FIG. 4 is a block diagram illustrating a configuration of a channel search system according to an exemplary embodiment of the present invention.

Referring to FIG. 4, the channel search system 400 includes a channel information collection unit 410, a search order determination unit 420, and a control unit 430.

The channel information collection unit 410 collects channel information from a first terminal which is provided with a WLAN service via a channel connection with a WLAN node.

Depending upon an exemplary embodiment of the present invention, the channel information collection unit 410 may collect the channel information through an overhearing operation with respect to a communication interfacing area of the first terminal. The first terminal is located in a coverage area of the WLAN node. As another exemplary example of the present invention, the channel information collection unit 410 may collect the channel information from the first terminal, which is operated as a router of an ad hoc network. In this embodiment, the first terminal maintains ad hoc routing information and a neighbor node list to perform an ad hoc routing function. Specifically, the second terminal requests the first terminal for the ad hoc routing information and the neighbor node list, and receives the ad hoc routing information and the neighbor node list from the first terminal. Accordingly, the second terminal may check the channel information between the first terminal and the WLAN node by referring to the received ad hoc routing information and the neighbor node list. In this embodiment, the ad hoc routing information is updated according to a routing protocol of an AODV, a DSDV, a WRP, or a CGSR. Accordingly, the second terminal may collect the current channel information which is set between the first terminal and the WLAN node.

The search order determination unit 420 identifies a channel connected between the first terminal and the WLAN node by the collected channel information. Accordingly, the search order determination unit 420 determines a channel search order for a channel connection between the second terminal and the WLAN node by using the identified channel, when the second terminal enters the coverage area of the WLAN node. For example, the search order determination unit 420 may set the identified channel as a channel to primarily search. Specifically, the search order determination unit 420 may search for the identified channel, other channels which are subsequent to the identified channel, or another channel which is adjacent to the identified channel.

Depending on an exemplary embodiment of the present invention, the channel search system 400 may further include a channel set unit 440 or an association processing unit 450.

The channel set unit 440 selects a channel where a channel connection between the second terminal and the WLAN node is allowed, according to the determined channel search order. Specifically, the channel set unit 440 searches a communicable channel for a registration of an association with the WLAN node, based on the channel search order, when the channel search system 400 enters the coverage area of the WLAN node.

Also, the association processing unit 450 transmits a registration request message from the second terminal to the WLAN node via the selected channel. Accordingly, the association processing unit 450 sets the channel connection between the second terminal and the WLAN node in response to the transmitted registration request message, and transmits the ACK signal to the second terminal.

Specifically, when the second terminal enters a coverage area of a corresponding node, the channel search system 400 may perform the vertical handoff more rapidly by varying the channel search order. Also, the channel search system 400 quickly performs the vertical handoff with respect to a communication terminal entering the coverage area, by referring to the first terminal located in the coverage area, and thereby may reduce power consumption for the vertical handoff.

The channel search method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like.

The computer-readable media can also be distributed over network-coupled computer systems so that the computer-readable code is stored and executed in a distributed fashion. Examples of program instructions include both machine code, such as produced by a compiler, and files containing higher level code that may be executed by the computer using an interpreter. Functional programs, codes, and code segments for accomplishing the present invention can be easily construed as within the scope of the invention by programmers skilled in the art to which the present invention pertains. The described hardware devices may be configured to act as one or more software modules in order to perform the operations of the above-described exemplary embodiments of the present invention.

According to exemplary embodiments of the present invention, in a channel search method and system for a vertical handoff in a wireless network environment, a terminal, which is located in a coverage area of a WLAN node, gives priority to a channel, which is used when setting an association and communicating with the WLAN node, and thereby may determine a channel search order of the terminal which enters the coverage area of the WLAN node.

Also, according to exemplary embodiments of the present invention, a channel search method and system for a vertical handoff in a wireless network environment varies a channel search order when entering a coverage area by referring to a terminal located in the coverage area, and thereby may quickly perform a vertical handoff.

Also, according to exemplary embodiments of the present invention, a channel search method and system for a vertical handoff in a wireless network environment quickly perform a vertical handoff when entering a coverage area by referring to a terminal located in the coverage area, and thereby may reduce power consumption for the vertical handoff.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A channel search method for a vertical handoff in a wireless network environment, the channel search method comprising:
   collecting channel information from a first terminal which is provided with a wireless local area network (WLAN) service via a channel connection with a WLAN node, the WLAN node providing a coverage area;
   determining a channel search order for a channel connection between a second terminal and the WLAN node by using the collected channel information;

selecting a channel where a channel connection between the second terminal and the WLAN node is allowed, according to the determined channel search order; and
providing the second terminal by the WLAN node with the WLAN service via the selected channel, when the second terminal enters a coverage area of the WLAN node,
wherein the collecting comprises:
collecting the channel information by performing an overhearing with respect to a communication interfacing area of the first terminal,
wherein the collecting of the channel information by performing the overhearing comprises:
performing the overhearing when the second terminal enters the communication interfacing area of the first terminal, before the second terminal enters the coverage area of the WLAN node; and
wherein the providing comprises:
transmitting a registration request message from the second terminal to the WLAN node via the selected channel; and
setting the channel connection between the second terminal and the WLAN node in response to the transmitted registration request message.

2. The channel search method of claim 1, wherein the collecting of the channel information by performing the overhearing comprises:
performing the overhearing when a communication interfacing area of the second terminal and the communication interfacing area of the first terminal are overlapped.

3. The channel search method of claim 1, wherein the determining comprises:
identifying a channel connected between the first terminal and the WLAN node by the collected channel information; and
determining the channel search order by setting the identified channel as a channel to primarily search.

4. The channel search method of claim 1, wherein, when the first terminal and the second terminal are connected, the collecting comprises:
acquiring ad hoc routing information from the first terminal when the first terminal and the second terminal exchange a signal; and
collecting the channel information from the acquired ad hoc routing information.

5. The channel search method of claim 1, wherein the determining a channel search order for a channel connection between a second terminal and the WLAN node relates to a search order for a vertical handoff between WLAN nodes.

6. The channel search method of claim 1, wherein the search order include first searching a set channel determined to be a channel to primarily search, and sequentially searching channels beginning with channels adjacent to the set channel and progressively searching channels adjacent to most recently searched channels.

7. The channel search method of claim 1, wherein the determining comprises:
identifying a channel by which the first terminal and the WLAN are connected based analyzing an amount of traffic being communicated over searched channels, the channel being a channel to primarily search; and
searching channels based on a search order that includes first searching a set channel determined to be a channel to primarily search, and sequentially searching channels beginning with channels adjacent to the set channel and progressively searching channels adjacent to most recently searched channels.

8. A non-transitory computer-readable recording medium storing a program for implementing a channel search method for a vertical handoff in a wireless network environment, the channel search method comprising:
collecting channel information from a first terminal which is provided with a WLAN service via a channel connection with a WLAN node, the WLAN node providing a coverage area;
determining a channel search order for a channel connection between a second terminal and the WLAN node by using the collected channel information;
selecting a channel where a channel connection between the second terminal and the WLAN node is allowed, according to the determined channel search order; and
providing the second terminal by the WLAN node with the WLAN service via the selected channel, when the second terminal enters a coverage area of the WLAN node,
wherein the collecting comprises:
collecting the channel information by performing an overhearing with respect to a communication interfacing area of the first terminal,
wherein the collecting of the channel information by performing the overhearing comprises:
performing the overhearing when the second terminal enters the communication interfacing area of the first terminal, before the second terminal enters the coverage area of the WLAN node; and
wherein the providing comprises:
transmitting a registration request message from the second terminal to the WLAN node via the selected channel; and
setting the channel connection between the second terminal and the WLAN node in response to the transmitted registration request message.

9. A channel search system for a vertical handoff in a wireless network environment, the channel search system comprising:
a channel information collection unit for collecting channel information from a first terminal which is provided with a WLAN service via a channel connection with a WLAN node, the WLAN node providing a coverage area;
a search order determination unit for determining a channel search order for a channel connection between a second terminal and the WLAN node by using the collected channel information;
a channel set unit configured to select a channel where a channel connection between the second terminal and the WLAN node is allowed, according to the determined channel search order; and
an association processing unit configured to transmit a registration request message from the second terminal to the WLAN node via the selected channel, and setting the channel connection between the second terminal and the WLAN node in response to the transmitted registration request message
wherein the channel information collection unit collects the channel information by performing an overhearing with respect to a communication interfacing area of the first terminal, and
wherein the channel information collection unit performs the overhearing when the second terminal enters the communication interfacing area of the first terminal, before the second terminal enters the coverage area of the WLAN node; and wherein the WLAN node provides the second terminal by the WLAN node with the WLAN service via the selected channel, when the second terminal enters a coverage area of the WLAN node.

10. The channel search system of claim 9, wherein the channel information collection unit performs the overhearing when a communication interfacing area of the second terminal and the communication interfacing area of the first terminal are overlapped.

11. The channel search system of claim 9, wherein the search order determination unit identifies a channel connected between the first terminal and the WLAN node from the collected channel information, and determines the channel search order by setting the identified channel as a channel to primarily search.

12. The channel search system of claim 9, wherein, when the first terminal and the second terminal are connected, the channel information collection unit acquires ad hoc routing information from the first terminal when the first terminal and the second terminal exchange a signal, and collects the channel information from the acquired ad hoc routing information.

13. The channel search system of claim 9, wherein the second node is adjacent to the WLAN node.

* * * * *